US012055334B2

(12) United States Patent
Kikuchi

(10) Patent No.: US 12,055,334 B2
(45) Date of Patent: Aug. 6, 2024

(54) REFRIGERATOR

(71) Applicant: SAMSUNG ELECTRONICS CO., LTD., Suwon-si (KR)

(72) Inventor: Manabu Kikuchi, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 510 days.

(21) Appl. No.: 17/294,908

(22) PCT Filed: Nov. 21, 2019

(86) PCT No.: PCT/KR2019/016063
§ 371 (c)(1),
(2) Date: May 18, 2021

(87) PCT Pub. No.: WO2020/116833
PCT Pub. Date: Jun. 11, 2020

(65) Prior Publication Data
US 2022/0018591 A1 Jan. 20, 2022

(30) Foreign Application Priority Data
Dec. 6, 2018 (JP) ................................ 2018-228648

(51) Int. Cl.
*F25D 23/00* (2006.01)
*E05D 3/16* (2006.01)
*F25D 23/02* (2006.01)

(52) U.S. Cl.
CPC ............ *F25D 23/028* (2013.01); *E05D 3/16* (2013.01); *E05D 2003/166* (2013.01); (Continued)

(58) Field of Classification Search
CPC ............ F25D 23/028; F25D 2323/021; F25D 2323/024; E05D 3/16; E05D 3/06; (Continued)

(56) References Cited

U.S. PATENT DOCUMENTS 7,517,031 B2 * 4/2009 Laible .................. F25D 23/065 312/401
9,115,928 B2 * 8/2015 Akalan ................ F25D 23/028
(Continued)

FOREIGN PATENT DOCUMENTS

CN 110094127 * 8/2019
DE 102015120565 * 6/2017
(Continued)

OTHER PUBLICATIONS

CN110094127 English translation (Year: 2019).*
(Continued)

*Primary Examiner* — Janet M Wilkens
(74) *Attorney, Agent, or Firm* — STAAS & HALSEY LLP

(57) ABSTRACT

The refrigerator includes a main body having an opening on a front side, an upper opening and a lower opening divided in the main body by a partition wall, an upper door to open and close the upper opening, a lower door to open and close the lower opening, and a hinge mechanism configured such that the door is rotatably coupled with respect to the main body, wherein the hinge mechanism includes a multiaxial hinge provided above and below each of the upper door and the lower door.

12 Claims, 18 Drawing Sheets

(52) U.S. Cl.
CPC ..... *E05Y 2900/31* (2013.01); *F25D 2323/021* (2013.01); *F25D 2323/024* (2013.01)

(58) Field of Classification Search
CPC . E05D 3/14; E05D 2003/166; E05D 11/1021; E05D 11/31; E05Y 2900/31
USPC .......................................... 312/405, 326–329
See application file for complete search history.

(56) References Cited

U.S. PATENT DOCUMENTS

| | | | | |
|---|---|---|---|---|
| 11,662,136 | B2 * | 5/2023 | Lottinville | F25D 23/085 312/405 |
| 11,725,869 | B2 * | 8/2023 | Harikrishnasamy | F25D 21/04 312/406 |
| 2019/0368247 | A1 * | 12/2019 | Carbone | E05D 3/14 |
| 2022/0034578 | A1 * | 2/2022 | Seo | F25D 23/028 |

FOREIGN PATENT DOCUMENTS

| | | | |
|---|---|---|---|
| EP | 2754982 | * | 7/2014 |
| EP | 2801775 | * | 11/2014 |
| JP | 2019-105125 | A | 6/2019 |
| KR | 20-1998-0062998 | U | 11/1998 |
| KR | 10-2004-0105030 | A | 12/2004 |
| KR | 10-2008-0085793 | A | 9/2008 |
| KR | 10-2015-0050939 | A | 5/2015 |
| KR | 10-1715301 | B1 | 3/2017 |
| KR | 20230060809 | * | 5/2023 |
| WO | 2019117236 | * | 6/2019 |
| WO | 2019226158 | * | 11/2019 |

OTHER PUBLICATIONS

KR20230060809 English translation (Year: 2023).*
International Search Report dated Mar. 24, 2020, in corresponding International Patent Application No. PCT/KR2019/016063.

* cited by examiner

REFRIGERATOR

CROSS-REFERENCE TO RELATED APPLICATIONS

This application is a U.S. National Stage Application which claims the benefit under 35 U.S.C. § 371 of International Patent Application No. PCT/KR2019/016063 filed on Nov. 21, 2019, which claims foreign priority benefit under 35 U.S.C. § 119 of Japanese Patent Application 2018-228648 filed on Dec. 6, 2018, in the Japanese Intellectual Property Office, the contents of both of which are incorporated herein by reference.

TECHNICAL FIELD

The present disclosure relates to a storage device and a refrigerator using the storage device.

BACKGROUND ART

A refrigerator is provided with a refrigerator main body having an opening in a front side, a door to open and close the opening, and a hinge mechanism to rotatably support the door with respect to the refrigerator main body. As shown in Patent Document 1, the hinge mechanism has a single axis of rotation, and the door is configured to rotate in the axial direction.

A refrigerator may be used by being integrally mounted in a storage space of a kitchen or used by being accommodated in storage furniture.

However, in the above types of use, there may be restrictions on a gap between the refrigerator and an adjacent wall. Accordingly, in a refrigerator having a one-axis hinge structure as described above, when a door is opened, a hinge side edge of the door comes into contact with the adjacent wall, so that the door may not be able to open completely.

DISCLOSURE

Technical Problem

The present disclosure is directed to providing a refrigerator capable of sufficiently opening a door by making a hinge side edge of the door difficult to come into contact with an adjacent wall when the door is opened.

Technical Solution

An aspect of the present disclosure provides a refrigerator including a main body having an opening on a front side, an upper opening and a lower opening divided in the main body by a partition wall, an upper door to open and close the upper opening, a lower door to open and close the lower opening, and a hinge mechanism configured so that the door is rotatably coupled with respect to the main body, wherein the hinge mechanism includes a multiaxial hinge, and wherein the multiaxial hinge includes a first hinge disposed below the upper door, a second hinge disposed above the lower door, a third hinge disposed above the upper door, a fourth hinge disposed below the lower door, a main body-side member fixed to the main body to connect the first hinge and the second hinge, a door-side member fixed to the upper door or the lower door, and a link mechanism configured to connect the main body-side member and the door-side member.

The link mechanism may include a plurality of shaft members, and the multiaxial hinge may be provided to be rotatable by the plurality of shaft members.

The main body-side member may include an upper protrusion connected to the link mechanism of the first hinge and having a flat plate shape; and a lower protrusion connected to the link mechanism of the second hinge and having a flat plate shape.

The multiaxial hinge may further include a reinforcing member provided between the upper protrusion and the lower protrusion to reinforce a strength of the main body-side member.

The link mechanism may include a plurality of links and a plurality of shaft members, the plurality of links may be rotatably connected to the main body-side member or the door-side member or the other link, and at least one of the plurality of links may include a concave portion to accommodate the shaft member provided on the other link depending on rotation.

The main body-side member and the link mechanism may be arranged to be symmetric up and down.

The plurality of shaft members may be formed in the same shape.

The multiaxial hinge may be mounted on the main body symmetrically left and right.

The multiaxial hinge may be connected by the main body-side member and the plurality of shaft members.

Strengths of the third hinge and the fourth hinge may be greater than strengths of the first hinge and the second hinge.

A strength of the first hinge and a strength of the second hinge may be different from each other.

Lengths of the first hinge and the second hinge may be different from each other in a direction perpendicular to an axis of rotation.

The multiaxial hinge may be mounted on the main body symmetrically left and right or symmetrically up and down.

The door may include a closing surface to close the opening, and the hinge mechanism may be disposed on a surface different from the closing surface.

Advantageous Effects

According to an embodiment of the present disclosure, because a hinge mechanism has multiaxial hinges provided on upper and lower sides of a door, a hinge side edge of the door is prevented from coming into contact with an adjacent wall when the door is opened, so that the door can be sufficiently opened.

MODE OF THE DISCLOSURE

Figure 1:
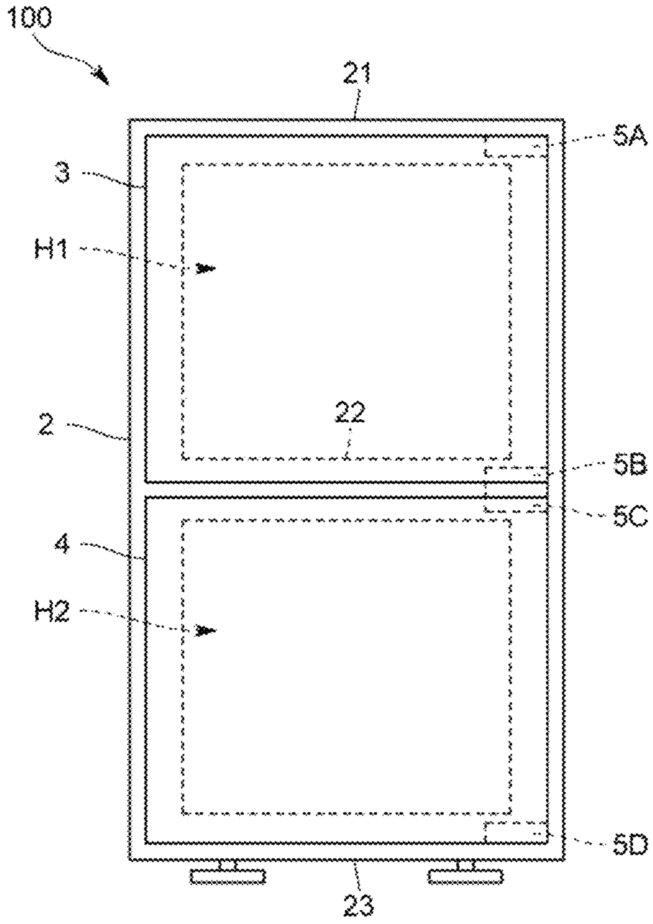
FIG. 1 is a schematic view of a refrigerator according to an embodiment of the present disclosure.

Hereinafter, an embodiment in which a refrigerator is configured using the storage device of the present invention will be described with reference to the drawings. As illustrated in FIG. 1, a refrigerator 100 according to the present embodiment includes a box-shaped refrigerator main body 2 having an upper opening H1 and a lower opening H2 divided by a partition wall 22 in a front side, an upper door 3 to open and close the upper opening H1, a lower door 4 to open and close the lower opening H2, and a hinge mechanism 5 to rotatably support the upper door 3 and the lower door 4 with respect to the refrigerator main body 2. An inner space of the refrigerator main body 2 is cooled by a refrigeration cycle composed of a compressor, a condenser, a decompression device, and a cooler, which are connected through pipes.

The hinge mechanism 5 includes a pair of multiaxial hinges 5A and 5B provided on upper and lower sides of the upper door 3, and a pair of multiaxial hinges 5C and 5D provided on upper and lower sides of the lower door 4. The multiaxial hinges 5A to 5D are provided on the front side of the refrigerator main body 2. The multiaxial hinge 5A provided above the upper door 3 is provided on an upper wall 21 of the refrigerator main body 2, and the multiaxial hinge 5B provided below the upper door 3 is provided on the partition wall 22. Also, the multiaxial hinge 5C provided above the lower door 4 is provided on the partition wall 22, and the multiaxial hinge 5D provided below the lower door 4 is provided on a lower wall 23 of the refrigerator main body 2.

Specifically, as shown in FIGS. 2 to 5, the multiaxial hinges 5A to 5D include a main body-side member 51 fixed to the refrigerator main body 2, a door-side member 52 fixed to the upper door 3 or the lower door 4, and a link mechanism 53 to connect the main body-side member 51 and the door-side member 52 to be relatively displaceable to each other. The four multiaxial hinges have the same rotational trajectory. Hereinafter, the multiaxial hinge 5B provided below the upper door 3 and the multiaxial hinge 5C provided above the lower door 4 will be described with reference to FIGS. 2 to 5, but the other multiaxial hinges 5A and 5D also have the same basic configuration as the above multiaxial hinges.

Figure 2:
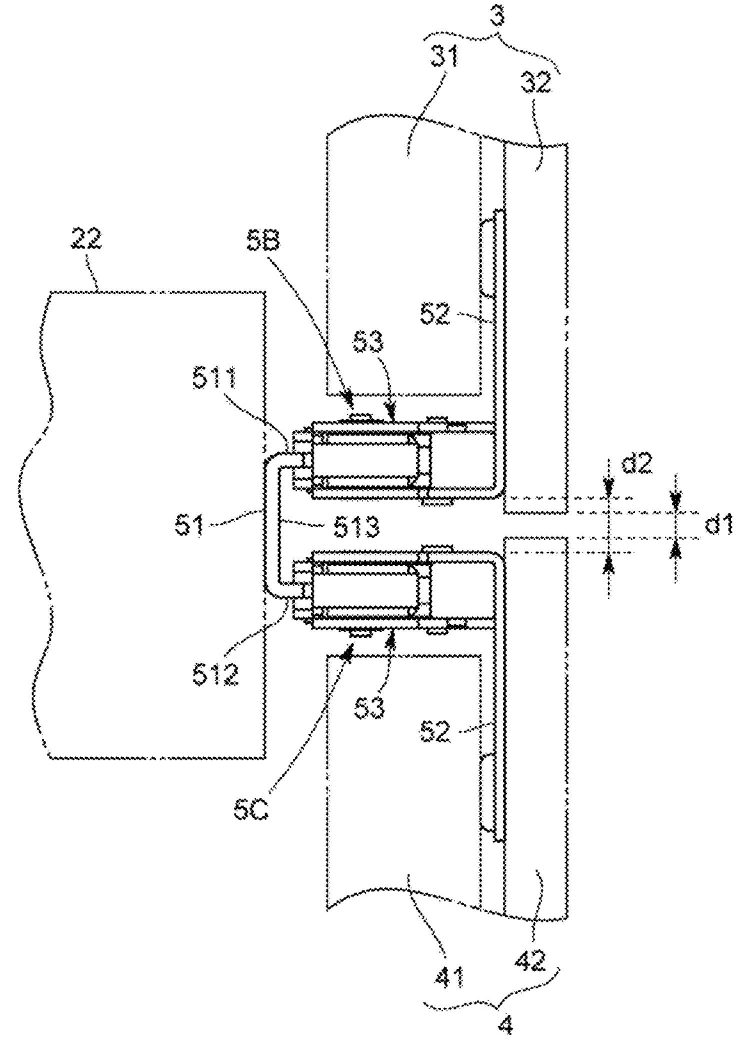
FIG. 2 is a side view illustrating a state in which two intermediate hinges are in a closing position in a hinge mechanism according to an embodiment of the present disclosure.
Figure 3:
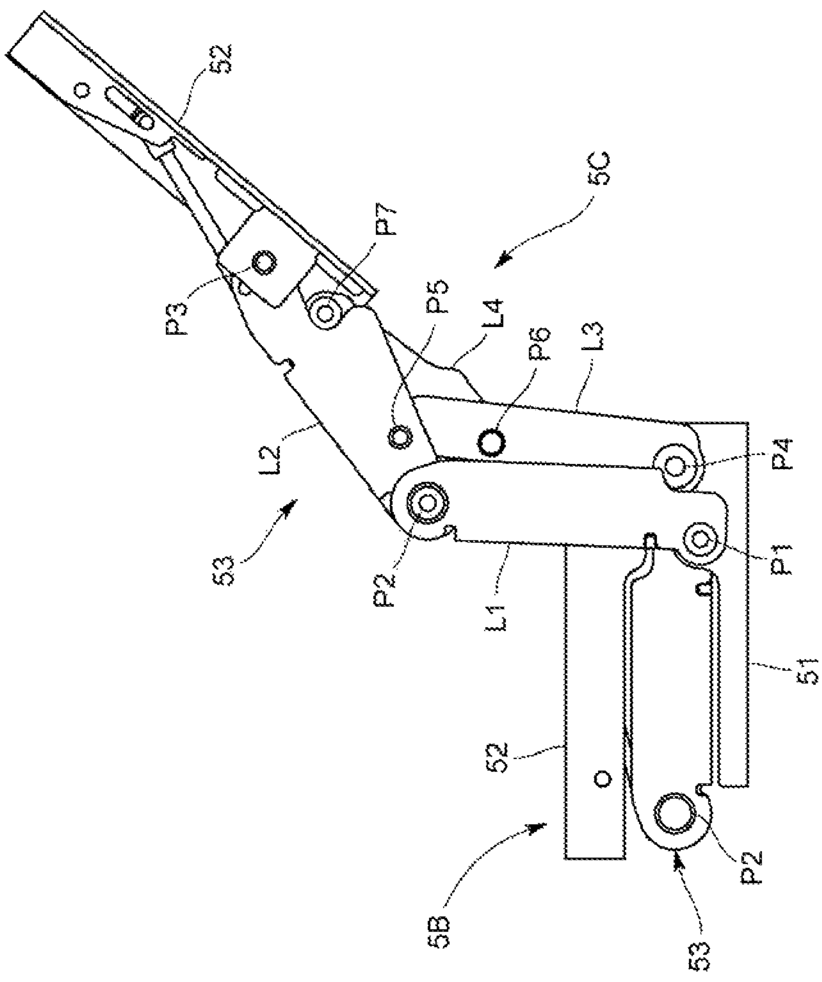
FIG. 3 is a bottom view illustrating a state in which one intermediate hinge (intermediate hinge 5C) is in an open position in the hinge mechanism according to an embodiment of the present disclosure.
Figure 4:
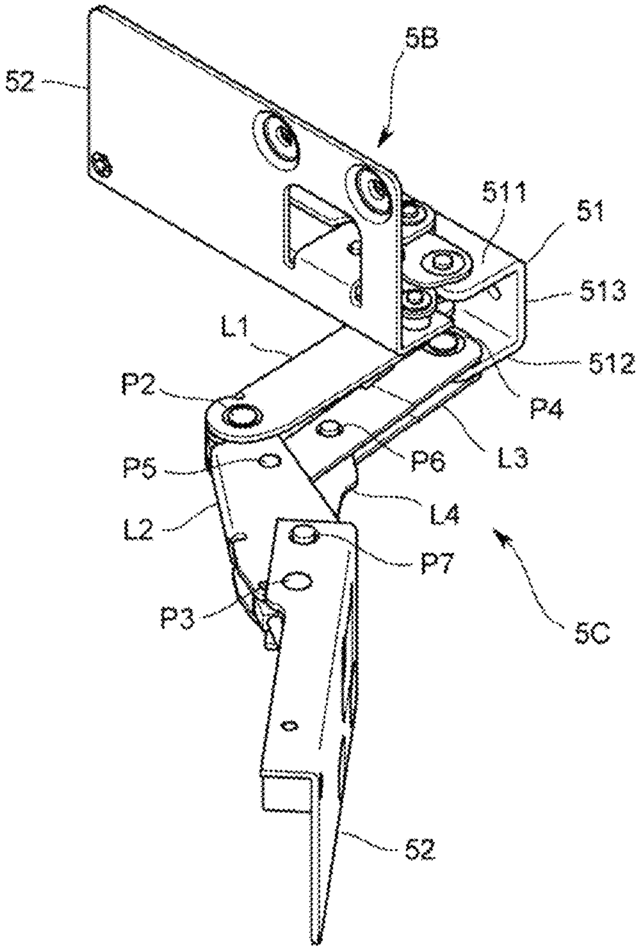
FIG. 4 is a perspective view illustrating the state in which the one intermediate hinge (intermediate hinge 5C) is in the open position in the hinge mechanism according to an embodiment of the present disclosure.
Figure 5:
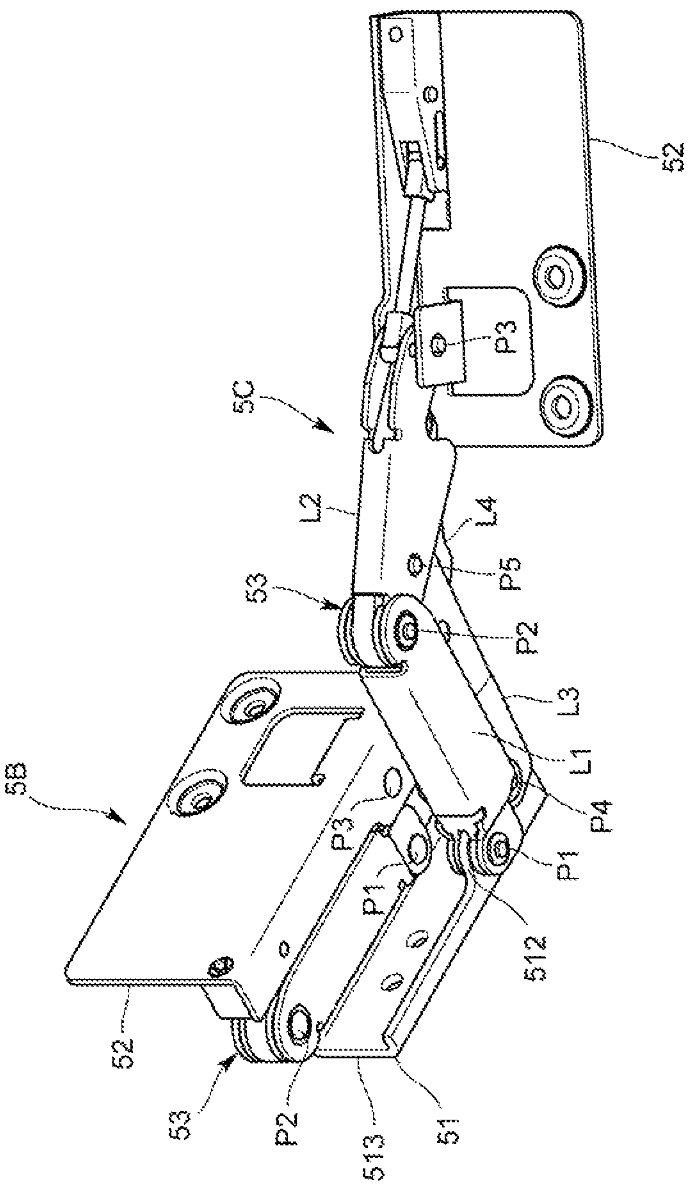
FIG. 5 is a perspective view illustrating the state in which the one intermediate hinge (intermediate hinge 5C) is in the open position in the hinge mechanism according to an embodiment of the present disclosure.

In this embodiment, door bodies 31 and 41 composed of an insulating member of the upper door 3 or the lower door 4 are fixed to one surface (inner surface) of the link mechanism 53 of the door-side member 52, and design panels 32 and 42 are fixed to the other surface (outer surface) opposite to the one surface of the link mechanism 53 of the door-side member 52 (see FIG. 2).

The link mechanism 53, which is a seven joint link mechanism, includes a plurality of (first to fourth) links L1 to L4 and a plurality of shaft members (first to seventh) P1 to P7 to rotatably connect the links L1 to L4.

One end of the first link arm L1 is connected to the main body-side member 51 by the first shaft member P1, and the other end of the first link arm L1 is connected to one end of the second link arm L2 by the second shaft member P2. The other end of the second link arm L2 is connected to the door-side member 52 by the third shaft member P3.

One end of the third link arm L3 is connected to the main body-side member 51 by the fourth shaft member P4, and the other end of the third link arm L3 is connected to the second link arm L2 by the fifth shaft member P5. A position of the second link arm L2 to which the other end of the third link arm L3 is connected is closer to the other end (inner side) of the second link arm L2 than a position of the second link arm L2 to which the other end of the first link arm L1 is connected.

One end of the fourth link arm L4 is connected to the third link arm L3 by the sixth shaft member P6. A position of the third link arm L3 to which one end of the fourth link arm L4 is connected is closer to one end (inner side) of the third link arm L3 than a position of the second link arm L2 to which one end of the third link arm L3 is connected. The other end of the fourth link arm L4 is connected to the door-side member 52 by the seventh shaft member P7.

Figure 6:
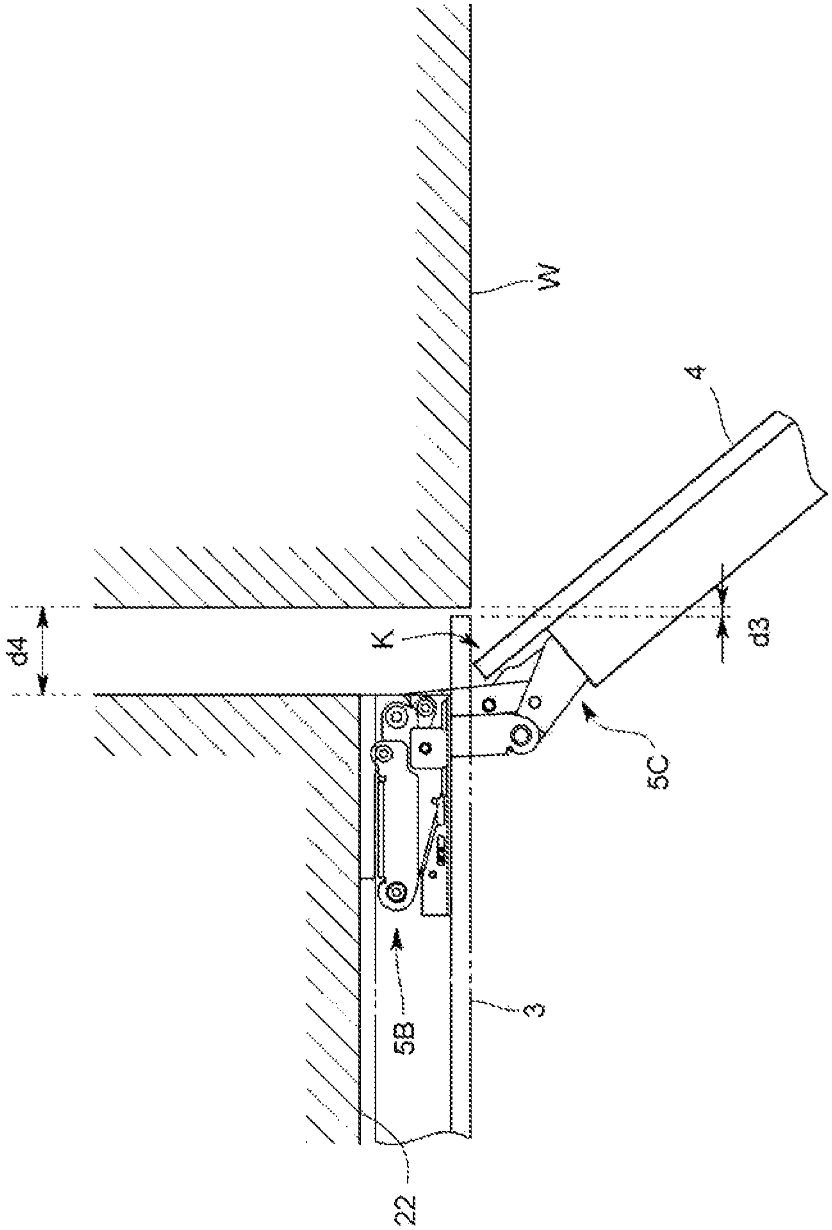
FIG. 6 is a view illustrating a positional relationship between a hinge side edge of a door and a wall in a state in which the door of the refrigerator according to an embodiment of the present disclosure is opened.
Figure 7A:
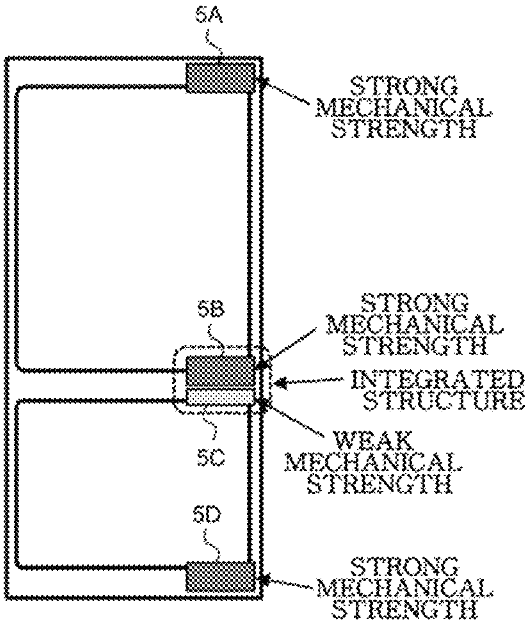
FIGS. 7A-7D are schematic views illustrating modified examples of two intermediate hinges in a general refrigerator according to another embodiment of the present disclosure.
Figure 7B:
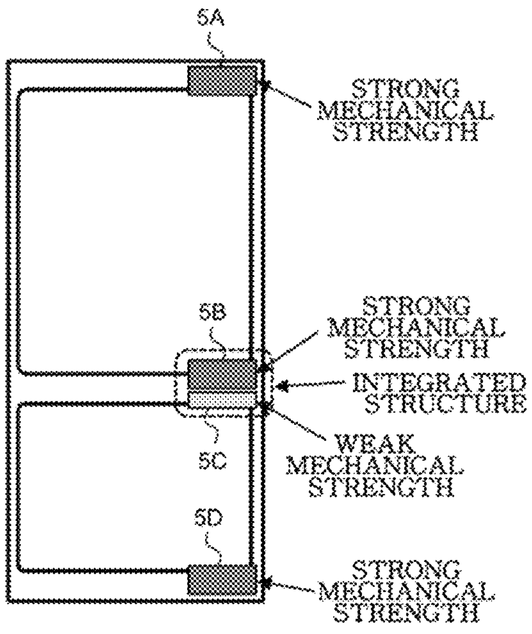
Figure 7C:
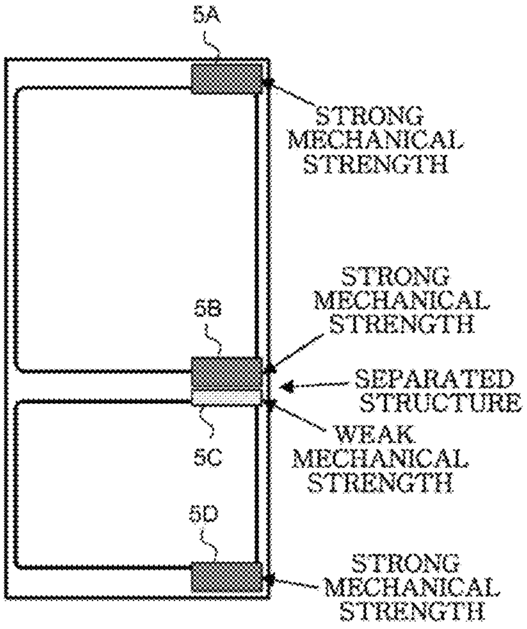
Figure 7D:
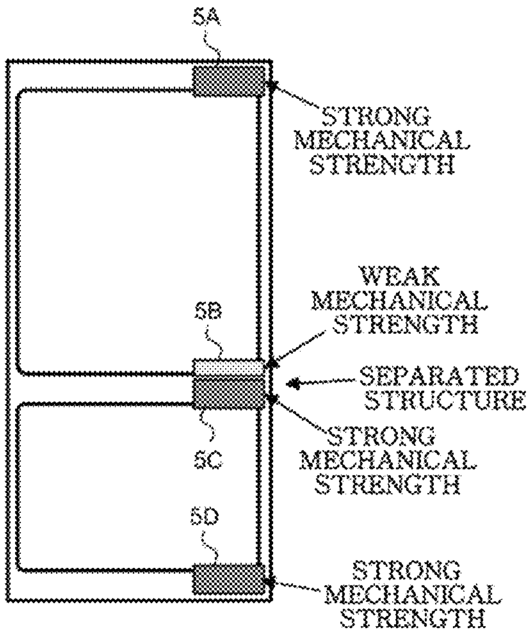
Figure 8A:
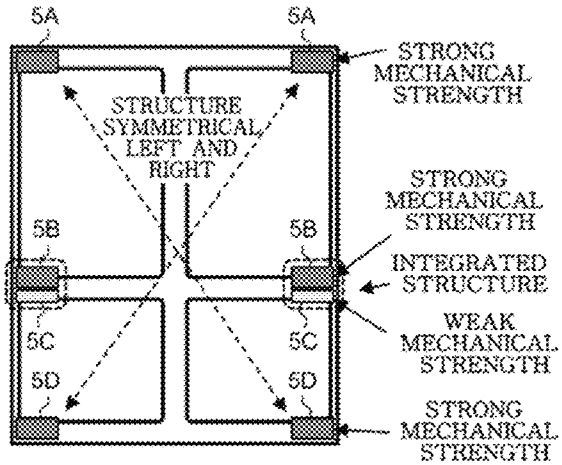
FIGS. 8A-8D are schematic views illustrating modified examples of two intermediate hinges in a side-by-side type refrigerator according to another embodiment of the present disclosure.
Figure 8B:
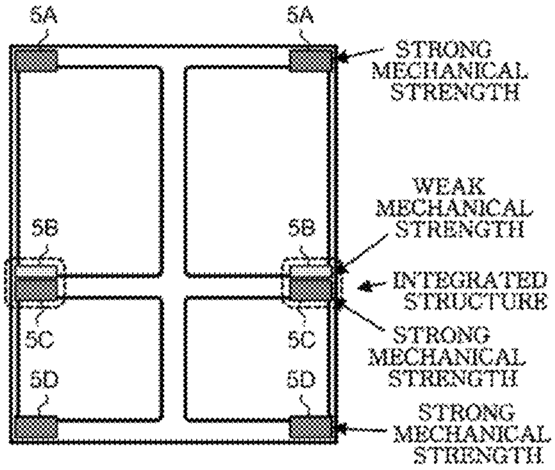
Figure 8C:
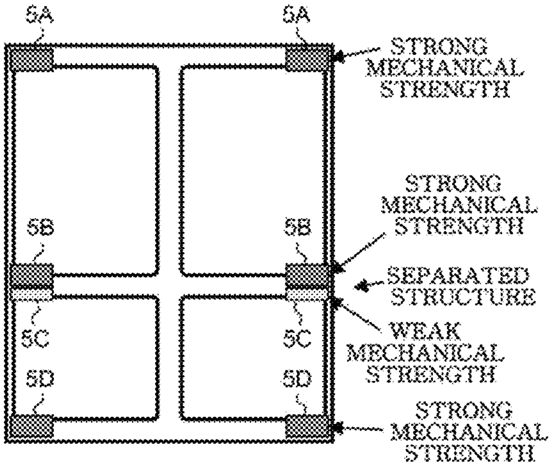
Figure 8D:
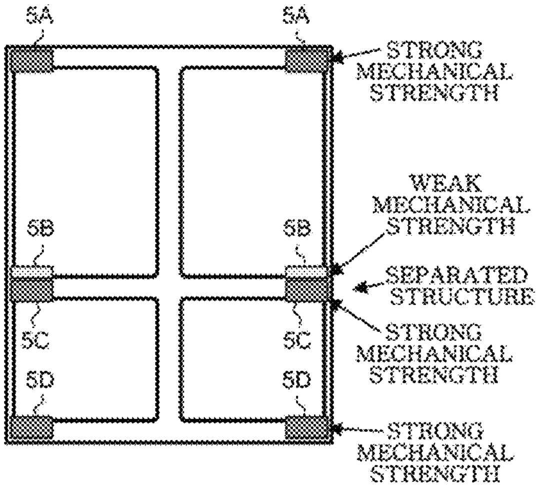

As illustrated in FIG. 6, the doors 3 and 4 rotate between a closing position for closing the openings H1 and H2 and an open position for opening the openings H1 and H2 by the link mechanism 53 as above, and at the same time as the doors 3 and 4 rotate from the close position to the open position, the hinge side edges of the doors 3 and 4 are spaced apart from the refrigerator main body 2.

The two multiaxial hinges 5B and 5C (hereinafter also referred to as "intermediate hinges 5B and 5C") positioned between the upper door 3 and the lower door 4 among the plurality of multiaxial hinges 5A to 5D have the main body-side member 51 in common.

The common main body-side member 51 (hereinafter also referred to as "common member 51") includes an upper protrusion 511 of a flat plate shape to which the link mechanism 53 of the multiaxial hinge 5B provided below the upper door 3 is connected, and a lower protrusion 512 of a flat plate shape to which the link mechanism 53 of the multiaxial hinge 5C provided above the lower door 4 is connected. In this embodiment, cross sections including the protrusions 511 and 512 have a substantially '⊏' shape, and an intermediate part 513 between the upper protrusion 511 and the lower protrusion 512 is screwed to the refrigerator main body 2 (specifically, a front surface of the partition wall 22). The common member 51 is provided such that the upper protrusion 511, the lower protrusion 512, and the intermediate part 513 are integrally formed.

In this embodiment, the two intermediate hinges 5B and 5C are configured such that components other than the door-side member 52, specifically the common member 51 and the link mechanism 53, are symmetric up and down. Also, the two intermediate hinges 5B and 5C are configured such that components other than the common member 51 and the door-side member 52, specifically the link arms L1 to L4 and the shaft members P1 to P7 of the link mechanism 53 have the same shape with each other. In this embodiment, the two intermediate hinges 5B and 5C are configured to be symmetrically mounted in the refrigerator main body 2.

A strength of the two intermediate hinges 5B and 5C configured as above is configured to be less than a strength of the multiaxial hinge 5A provided above the upper door 3 and the multiaxial hinge 5D provided below the lower door 4. By this configuration, most of a load of the upper door 3 is supported by the multiaxial hinge 5A provided above the upper door 3, and most of a load of the lower door 4 is supported by the multiaxial hinge 5D provided below the lower door 4. As a result, the strength of the two intermediate hinges 5B and 5C does not need to be large, so that a thickness of the two intermediate hinges 5B and 5C may be made thin, an inner volume of the main body may be increased by reducing a thickness of the partition wall 22.

In addition, as illustrated in FIG. 2, a distance d1 between the design panels 32 and 42 fixed to the door-side members 52 of the two intermediate hinges 5B and 5C is provided to be smaller than a distance d2 between the door-side members 52 of the two intermediate hinges 5B and 5C. By this configuration, a position adjustment area of the design panels 32 and 42 in the vertical direction with respect to the door-side members 52 may be secured.

Effects of this Embodiment

According to the refrigerator 100 of the present embodiment configured as above, because the hinge mechanism 5 includes the multiaxial hinges 5A to 5D provided above and below the doors 3 and 4, when the hinge mechanism 5 opens the doors 3 and 4, the doors 3 and 4 may be moved forward from the refrigerator main body 2. As a result, even in a case in which the refrigerator 100 is integrally mounted and used in a storage space of a kitchen or accommodated and used in a storage furniture, an edge K of a hinge side door does not come into contact with an adjacent wall W when the doors 3 and 4 are opened (refer FIG. 6), so that the doors 3 and 4 may be sufficiently opened. It is appropriate that a distance d3 between the design panels 32 and 42 and an inner surface of the wall W becomes a distance between the refrigerator 100 and the wall W when the upper door 3 or the lower door 4 is closed, and a distance d4 between the refrigerator main body 2 and the inner surface of the wall W is long in terms of heat dissipation.

Because the two intermediate hinges 5B and 5C have the common main body-side member 51, the thickness of the partition wall 22 may be reduced, and the inner volume of the main body may be prevented from being reduced compared to a refrigerator having the same height. In addition, because the main body-side member 51 is provided in common at the two intermediate hinges 5B and 5C, even when the thickness of the two intermediate hinges 5B and 5C is thin, a mechanical strength of the common main body-side member 51 may be secured.

Because the common main body-side member 51 is configured such that the intermediate part 513 between the upper protrusion 511 and the lower protrusion 512 is fixed to the refrigerator main body 2, while the mechanical strength of the main body-side member 51 is secured, an installation space into the refrigerator main body 2 may be reduced. Further, because the upper protrusion 511 and the lower protrusion 512 to which the link mechanism 53 is connected are formed in a flat plate shape, the thickness of the two intermediate hinges 5B and 5C may be reduced.

Other Modified Examples

The present disclosure is not limited to the above embodiment.

For example, although the link mechanism of the above embodiment is a seven-joint link mechanism, other multi joint link mechanisms may be used.

In addition, the hinge mechanism in the above embodiment is configured such that the two intermediate hinges 5B and 5C have one main body-side member in common, but may be configured to have a separate member. Further, in a case in which the two intermediate hinges 5B and 5C have the main body-side member in common, the main body-side member may be composed of a single member or may be composed of a plurality of members.

The two intermediate hinges 5B and 5C in the above embodiment are configured such that components other than the door-side member are symmetrical up and down, but the components may be configured asymmetrically. In addition, the door-side member may also be configured asymmetrically. That is, a mechanical strength of the intermediate hinge 5B and a mechanical strength of the intermediate hinge 5C may be configured differently. For example, because when the upper door is a refrigerating compartment door and the lower door is a freezing compartment door, the upper door becomes heavier than the lower door due to a storage weight of a door pocket of the upper door, it may be considered to make the mechanical strength of the intermediate hinge 5B stronger than that of the intermediate hinge 5C. It may be considered to increase the size of the components as a method of increasing the mechanical strength. In addition, this configuration may be applied to a case in which the two intermediate hinges 5B and 5C have separate main body-side members, as well as the case in which the two intermediate hinges 5B and 5C have one main body-side member in common.

FIG. 7 illustrates modified examples of the mechanical strengths of the two intermediate hinges 5B and 5C. FIG. 7*a* illustrates a case in which the mechanical strength of the intermediate hinge 5B is stronger than that of the intermediate hinge 5C, and FIG. 7*b* illustrates a case in which the mechanical strength of the intermediate hinge 5C is stronger than that of the intermediate hinge 5B. This configuration may be applied to a case in which the two intermediate hinges 5B and 5C have separate main body-side members, as well as the case in which the two intermediate hinges 5B and 5C have one main body-side member in common (FIG. 7*c* and FIG. 7*d*).

Although FIG. 7 illustrates a case in which both mechanical strengths of the multiaxial hinge 5A positioned above the upper door 3 and the multiaxial hinge 5D positioned below the lower door 4 are strong, in a case in which the mechanical strengths of the intermediate hinges 5B and 5C are strong, a mechanical strength of the corresponding multiaxial hinge (multiaxial hinge 5A in a case in which the mechanical strength of the intermediate hinge 5B is strong, and multiaxial hinge 5D in a case in which the mechanical strength of the intermediate hinge 5C is strong) may be weakened.

Figure 9:
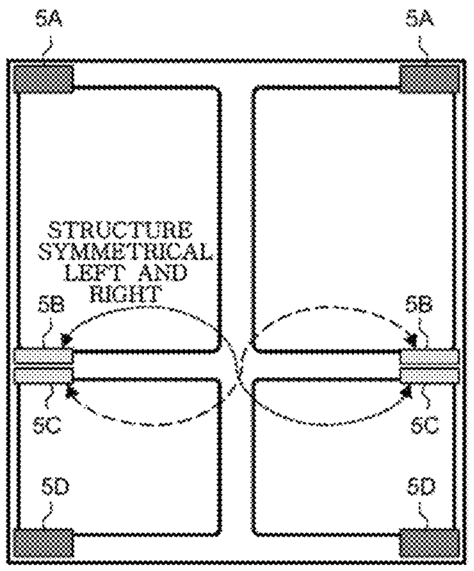
FIG. 9 is a schematic view illustrating a modified example of two intermediate hinges in a side-by-side type refrigerator according to another embodiment of the present disclosure.

FIG. 8 illustrates modified examples of the mechanical strengths of the two intermediate hinges 5B and 5C in a side-by-side refrigerator. FIG. 8*a* illustrates a case in which the mechanical strength of the intermediate hinge 5B is stronger than that of the intermediate hinge 5C in the left and right two intermediate hinges 5B and 5C, and FIG. 8*b* illustrates a case in which the mechanical strength of the intermediate hinge 5C is stronger than that of the intermediate hinge 5B in the left and right two intermediate hinges 5B and 5C. In the left and right two intermediate hinges 5B and 5C, the hinges having a strong mechanical strength may be provided differently. For example, the mechanical strength of the intermediate hinge 5B is strong in the left two intermediate hinges 5B and 5C, and the mechanical strength of the intermediate hinge 5C is strong in the right two intermediate hinges 5B and 5C. This configuration may be applied to a case in which the two intermediate hinges 5B and 5C have separate main body-side members, as well as the case in which the two intermediate hinges 5B and 5C have one main body-side member in common (FIG. 8*c* and FIG. 8*d*). In addition, in a case in which the two intermediate hinges 5B and 5C are provided in a separate structure, as illustrated in FIG. 9, one side of the left two intermediate hinges 5B and 5C (e.g., left intermediate hinge 5B) and the other side of the right two intermediate hinges 5B and 5C (e.g., right intermediate hinge 5C) may have a structure capable of being used symmetrically left and right.

Although FIG. 8 illustrates a case in which both mechanical strengths of the multiaxial hinge 5A positioned above the upper door 3 and the multiaxial hinge 5D positioned below the lower door 4 are strong, in a case in which the mechanical strengths of the intermediate hinges 5B and 5C are strong, a mechanical strength of the corresponding multiaxial hinge (multiaxial hinge 5A in a case in which the mechanical strength of the intermediate hinge 5B is strong, and multiaxial hinge 5D in a case in which the mechanical strength of the intermediate hinge 5C is strong) may be weakened.

In addition, in the two multiaxial hinges 5B and 5C positioned between the upper door 3 and the lower door 4, the strength of the multiaxial hinge 5B positioned at the upper side and the strength of the multiaxial hinge 5C positioned at the lower side may be different from each other. Specifically, it is appropriate that a thickness viewed in a direction orthogonal to a rotational axis of the multiaxial hinge 5B positioned at the upper side and a thickness viewed in a direction orthogonal to a rotational axis of the multiaxial hinge 5C positioned at the lower side are different from each other. Specifically, a thickness of the link mechanism 53 of the multiaxial hinge 5B positioned at the upper side and a thickness of the link mechanism 53 of the multiaxial hinge 5C positioned at the lower side are different from each other. Both ones positioned at the upper and lower sides may be thick. In addition, in this configuration, it is appropriate that the two multiaxial hinges 5B and 5C positioned between the upper door 3 and the lower door 4 are configured to be mounted symmetrically left and right or symmetrically up and down on the refrigerator main body 2. In this case, the multiaxial hinge (the multiaxial hinge 5A in the case of the multiaxial hinge 5B, and the multiaxial hinge 5D in the case of the multiaxial hinge 5C) supporting the door together with the multiaxial hinge 5B or 5C of the thick side may have a small thickness.

In the above embodiment, the two intermediate hinges 5B and 5C are configured to be mounted symmetrically left and right in the refrigerator main body 2, but may not be configured to be mounted symmetrically left and right.

In addition, although the common member in the above embodiment has a substantially '⊏' shape in cross section including the protrusion, the shape of the common member is not limited thereto.

Further, although the two intermediate hinges in the above embodiment are configured such that the first shaft member and the fourth shaft member are provided separately for each hinge, the two intermediate hinges may be configured such that the first shaft member functions as one common member and may be configured such that the fourth shaft member functions as one common member. In this case, these common members are provided over the upper and lower protrusions of the common member. By this configuration, the two intermediate hinges are configured to be rotatable by mutually common shaft members.

In order to easily secure a portion on the closing surface of the door that seals the opening, it is appropriate that the hinge mechanism 5 is provided on a surface different from the closing surface on which the door closes the opening. That is, the door-side member 52 of the hinge mechanism 5 is provided on surfaces different from the closing surfaces of the doors 3 and 4.

Figure 10A:
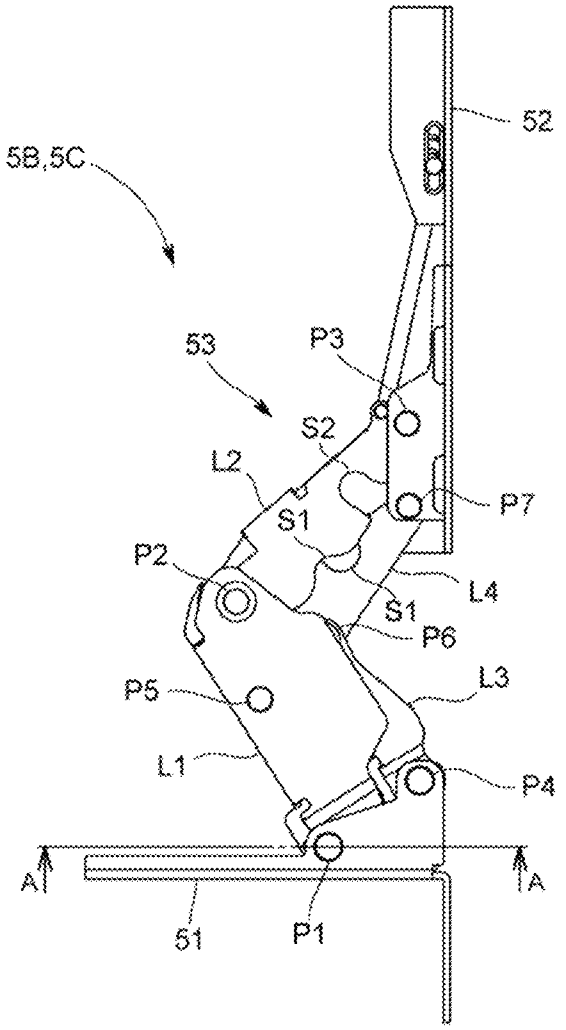
FIG. 10A is a plan view of a hinge mechanism in an open position according to another embodiment of the present disclosure.
Figure 10B:
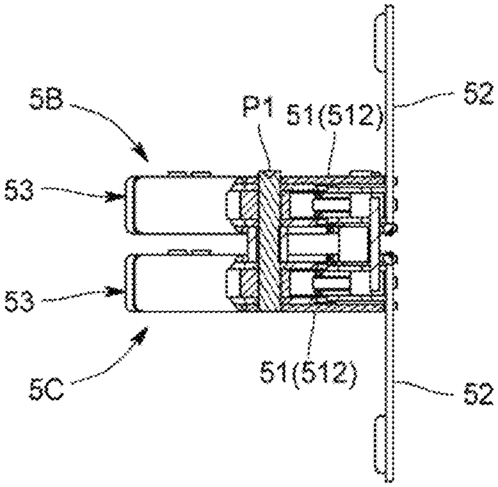
FIG. 10B is a cross-sectional view taken along line A-A in FIG. 10A.

Although in the above embodiment, the two intermediate hinges 5B and 5C are connected by a shaft member separately from the main body-side member 51, as illustrated in FIGS. 10A and 10B, the first shaft member P1 of the intermediate hinge 5B and the first shaft member P1 of the intermediate hinge 5C may function as common shaft members. Similarly, the fourth shaft member P4 of the intermediate hinge 5B and the fourth shaft member P4 of the intermediate hinge 5C may function as common shaft members. By this configuration, the two intermediate hinges are configured to be rotatable by mutually common shaft members. By this configuration, the number of parts of the shaft member may be reduced. The link mechanism 53 in FIGS. 10A and 10B is slightly different in configuration from the link mechanism 53 in the above embodiment, but the operation is the same.

As illustrated in FIGS. 10A and 10B, at least one of the plurality of links of the link mechanism 53 has a concave portion to accommodate a shaft member provided in the other link depending on rotation thereof. Specifically, some of the plurality of links have a first concave portion S1 to accommodate the shaft member of the other link in a state in which the door is located in the closing position where the opening is closed, and some of the plurality of links have a second concave portion S2 to accommodate the shaft member of the other link in a state in which the door is located in the open position where the opening is open. In FIG. 10A, the first concave portion S1 to accommodate the fifth shaft member P5 and the second concave portion S2 to accommodate the seventh shaft member P7 are provided on the second link L2. Also, the first concave portion S1 to accommodate the third shaft member P3 is provided on the fourth link L4.

Figure 11:
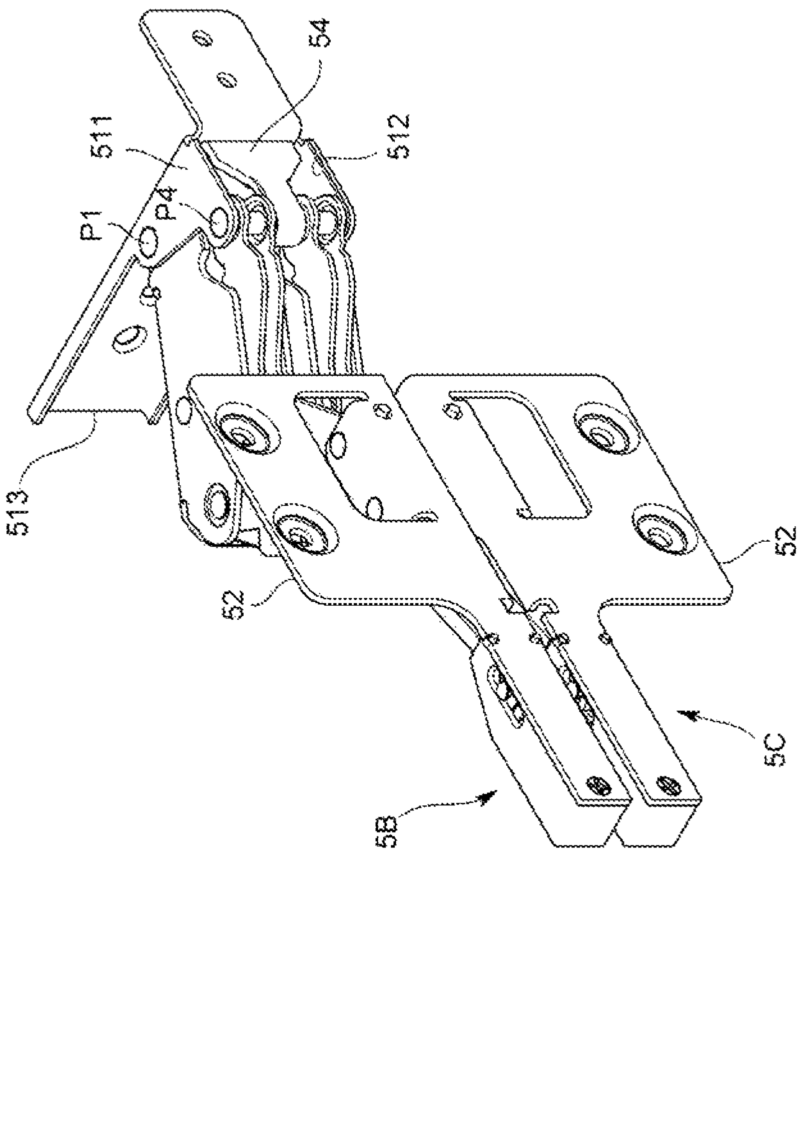
FIG. 11 is a perspective view illustrating a state in which the one intermediate hinge (intermediate hinge 5B) is in an open position in a hinge mechanism (two intermediate hinges) according to another embodiment of the present disclosure.

As illustrated in FIG. 11, the two intermediate hinges 5B and 5C may be configured to have a reinforcing member (spacer) 54 between the intermediate hinge 5B and the intermediate hinge 5C in order to reinforce a mechanical strength. Specifically, the reinforcing member 54 is provided to reinforce the mechanical strength of the main body-side member 51 and provided on the intermediate part 513 between the upper protrusion 511 and the lower protrusion 512 of the main body-side member 51. Further, the reinforcing member 54 supports a central portion of the fourth shaft member P4 (between the third link L3) to reinforce the mechanical strength of the fourth shaft member P4. The reinforcing member 54 may also be configured to reinforce the first shaft member P1.

In the above embodiment, a refrigerator is described using a storage device, but the present disclosure is not limited to a refrigerator and may be applied to other storage devices.

In addition, the present disclosure is not limited to the above embodiments, and various modifications are possible without departing from the purpose of the present disclosure.

The invention claimed is:

1. A refrigerator comprising:

a main body having an opening on a front side;

an upper opening and a lower opening divided in the main body by a partition wall;

an upper door to open and close the upper opening;

a lower door to open and close the lower opening; and a hinge mechanism configured so that the upper door and the lower door are rotatably coupled with respect to the main body, wherein the hinge mechanism comprises a multiaxial hinge, and wherein the multiaxial hinge comprises:

a first hinge disposed below the upper door;

a second hinge disposed above the lower door;

a main body-side member fixed to the main body and connecting the first hinge and the second hinge;

a first door-side member fixed to the upper door;

a second door-side member fixed to the lower door;

a first link mechanism including a plurality of first shaft members, and configured to connect the main body-side member and the first door-side member; and a second link mechanism including a plurality of second shaft members, and configured to connect the main body-side member and the second door-side member, wherein at least one shaft member of the plurality of first shaft members and the plurality of second shaft members is a common shaft member of the plurality of first shaft members and the plurality of second shaft members, wherein the main body-side member comprises:

an upper protrusion connected to the first link mechanism; and a lower protrusion connected to the second link mechanism; and the multiaxial hinge further comprises:

a reinforcing member between the upper protrusion and the lower protrusion and supporting a central portion of the common shaft member.

2. The refrigerator according to claim 1, wherein the first hinge is provided to be rotatable by the plurality of first shaft members, and the second hinge is provided to be rotatable by the plurality of second shaft members.

3. The refrigerator according to claim 1, wherein the first link mechanism comprises a plurality of first links, the plurality of first links are rotatably connected to the main body-side member, the first door-side member, or a first link of the plurality of first links, and at least one first link of the plurality of first links comprises a concave portion to accommodate a first shaft member of the plurality of first shaft members provided on a second link of the plurality of first links depending on rotation.

4. The refrigerator according to claim 1, wherein the main body-side member, the first link mechanism, and the second link mechanism are arranged to be symmetric up and down.

5. The refrigerator according to claim 1, wherein each first shaft member of the plurality of first shaft members and each second shaft member of the plurality of second shaft members has a same shape.

6. The refrigerator according to claim 1, wherein the multiaxial hinge is mounted on the main body symmetrically left and right.

7. The refrigerator according to claim 1, wherein the multiaxial hinge is connected by the main body-side member, the plurality of first shaft members, and the plurality of second shaft members.

8. The refrigerator according to claim 1, further comprising:

a third hinge disposed above the upper door; and a fourth hinge disposed below the lower door, wherein strengths of the third hinge and the fourth hinge are greater than strengths of the first hinge and the second hinge.

9. The refrigerator according to claim 1, wherein a strength of the first hinge and a strength of the second hinge are different from each other.

10. The refrigerator according to claim 9, wherein the multiaxial hinge is mounted on the main body symmetrically left and right or symmetrically up and down.

11. The refrigerator according to claim 1, wherein the upper door comprises an upper door closing surface to close the upper opening, the lower door comprises a lower door closing surface to close the lower opening, the first door-side member is disposed on a surface different from the upper door closing surface, and the second door-side member is disposed on a surface different from the lower door closing surface.

12. The refrigerator according to claim 1, wherein the second link mechanism comprises a plurality of second links, the plurality of second links are rotatably connected to the main body-side member, the second door-side member, or a second link of the plurality of second links, and at least one second link of the plurality of second links comprises a concave portion to accommodate a second shaft member of the plurality of second shaft members provided on a third link of the plurality of second links depending on rotation.

* * * * *